Dec. 30, 1952   E. M. GOURBEYRE ET AL   2,623,690
AVERAGE SPEED INDICATOR

Filed July 7, 1948   7 Sheets-Sheet 1

INVENTORS
EMILE MARIUS GOURBEYRE
CLAUDE JACQUES LADISLAS MARIE GOURBEYRE
BY Robert E. Burns
ATTORNEY Dec. 30, 1952 E. M. GOURBEYRE ET AL 2,623,690
AVERAGE SPEED INDICATOR
Filed July 7, 1948 7 Sheets-Sheet 3

INVENTORS
EMILE MARIUS GOURBEYRE
CLAUDE JACQUES LADISLAS MARIE GOURBEYRE
BY
ATTORNEY

INVENTORS
EMILE MARIUS GOURBEYRE
CLAUDE JACQUES LADISLAS MARIE GOURBEYRE
BY Robert E Burns
ATTORNEY Dec. 30, 1952 E. M. GOURBEYRE ET AL 2,623,690
AVERAGE SPEED INDICATOR Filed July 7, 1948 7 Sheets-Sheet 7

Fig. 10

INVENTORS
EMILE MARIUS GOURBEYRE
CLAUDE JACQUES LADISLAS MARIE GOURBEYRE
BY
ATTORNEY

Patented Dec. 30, 1952

2,623,690

UNITED STATES PATENT OFFICE 2,623,690

AVERAGE SPEED INDICATOR

Emile Marius Gourbeyre and Claude Jacques
L. M. Gourbeyre, Orleans, France

Application July 7, 1948, Serial No. 37,358
In France January 20, 1948

7 Claims. (Cl. 235—61)

Various types of tachometers are already known which indicate visually the number of revolutions per minute, the number of meters per minute, the number of kilometers per hour, the hours/revolutions and the like and which can be used on motor cars, rail vehicles, aircrafts, machine-tools, spinning-factory machines and the like.

Certain of these prior devices indicate by a direct reading on a graduated dial, any mean value at the moment of reading. However, these have been complicated and expensive.

The present invention has for its object to remedy the disadvantages of the prior constructions.

The present invention relates to a mean indicating apparatus, e. g. for indicating the speed of a vehicle, which is characterized by two members which moves independently of each other but are juxtaposed and move relatively to one another, one of the members being controlled by a cumulative quantity such as the distance covered, and the other member being controlled by the time elapsed. The relative spacing of both said movable members is such that they indicate visually at any moment the quotient of both measured quantities, i. e. the desired mean, e. g. miles per hour.

According to one embodiment of the invention, one of the independent movable members comprises a graduated disc and the other member comprises a concentric crown surrounding the disc and carrying a pointer or the like which is adapted to move in front of the graduations on the disc, which makes it possible to read at any moment on the graduated disc the relative relationship of the two independently movable members, i. e. the desired mean.

According to a feature of the invention each of the movable members is driven by the time indicating mechanism or by the distance indicating mechanism through the medium of a cam which converts the movement transmitted by these mechanisms according to a predetermined ratio, e. g. a logarithmic ratio, which makes it possible, more particularly, to reduce the amplitude of the displacements effected by the movable members.

According to another feature of the invention each movable member is driven through the medium of a change speed gear which effects automatically, after a predetermined displacement of the movable members, a modification of the reduction ratio for the movement transmitted to the movable members, which makes it possible to reduce the displacements of the movable members as well as the space required by the graduations or the like by means of which the relative positions of the movable members are shown.

The invention also includes an embodiment wherein each movable member is driven in a single direction in a groove of a cam, on the one hand, and in a rectilinear slideway of the frame supporting the movable members, on the other hand.

According to one embodiment of the invention, the mechanism used for driving the movable member which moves in response to the value of the distance traveled is driven from a counter through the medium of a device making is possible to eliminate the counting of a predetermined initial quantity which makes is possible, more particularly, to obtain progressions according to logarithmic laws.

According to another feature of the invention the disc and the concentric crown of the two movable members are arranged on the front face of a casing containing two mechanisms located in two opposed angles of said casing, one for driving the disc and the other for driving the crown.

More specifically, the invention covers the hereinbelow described features and their various possible combinations.

A device embodying features of the invention is shown by way of example in the following drawings, in which.

The indicator in accordance with the invention comprises two movable members moving with respect to each other, the first depending on the distance traveled and the second depending on the time elapsed.

The movable member which moves in response to the value of the distance traveled comprises a disc 1 and its driving mechanism is shown on Figures 1 to 5. Disc 1 which is secured to a crown 5 carrying five equidistant notches on its periphery is mounted loosely on a shaft 2. A crank 3 is also mounted freely on shaft 2 and carries a pawl 4 at its end. Pawl 4 is urged by a spring 6 which constantly applies the tooth of the pawl against the periphery of crown 5 and tends to cause it to engage the notches of the crown.

Figure 1:
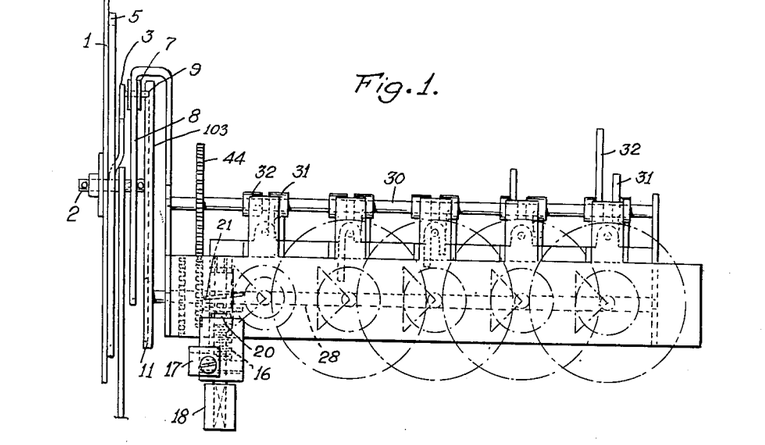
Figures 1, 2 and 3 are an elevational view, an end view and a top plan view, respectively, of the mechanism driving the disc in response to the value of the distance traveled.

A second pawl 15 linked on the casing is maintained by a spring against the periphery of crown 5 and engages the notches of said crown at the same time as the preceding pawl and insures the maintenance of the disc in the desired position.

Furthermore, crank 3 comprises a longitudinal slideway 10. Crank 3 is urged at its end opposite pawl 4 by a drawspring 14 connected with the casing.

Mounted so as to move in a rectilinear slideway 8 carried by said casing behind the moving plane of crank 3 is a slide 7 secured to a cross axis 9 which projects on both sides of slideway 8.

The end of axis 9 on the side of disc 1 engages the longitudinal slideway 10 of crank 3 while the opposite end engages a suitably shaped groove 11 provided in a cam plate 103. The outline of grove 11 is such that the displacement of disc 1 is effected under the action of the rotation of cam 103 according to a logarithmic scale.

Cam 103 is keyed on the end of a shaft 13 rotating in the casing and carrying a driving gear 12.

Driving gear 12 engages a gear 29 keyed on one end of the general driving shaft 28 which is driven as will be presently explained.

The general driving shaft 28 carries five bevel pinions 27 keyed on the shaft and corresponding to the five displacements of the disc, the pinions being capable of being alternately engaged as will be explained later on.

The bevel pinion 27 which is nearest disc 1 engages a combined bevel pinion 24 loosely mounted on a secondary shaft 23 perpendicular to general shaft 28 and similarly rotatable in the casing.

Bevel pinion 24 is connected to a crown 25 provided with claws or teeth. A sleeve 26 slidably keyed on shaft 23 and carrying on the side of bevel gear 24 teeth corresponding to those of pinion 24 can thus, through longitudinal displacement in either direction, connect bevel pinion 24 with shaft 23 or free the pinion.

Furthermore, shaft 23 carries a pinion 22 with helical teeth engaging a worm 21 rotating on an axis 104 perpendicular to axis 23 and carried in the casing. Axis 104 carries a small driving plate 20 (Figure 2) at its end.

Figures 2, 2A:
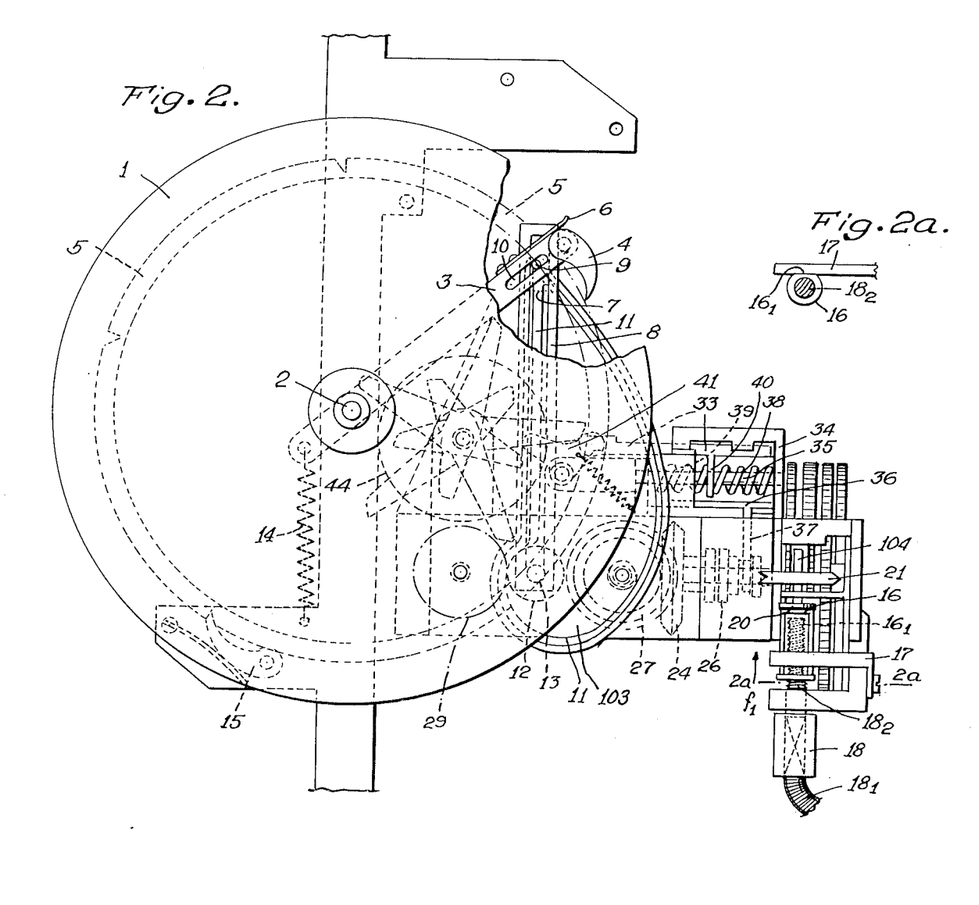
Fig. 2A is a section on line $2a$—$2a$ of Fig. 2.
Figure 3:
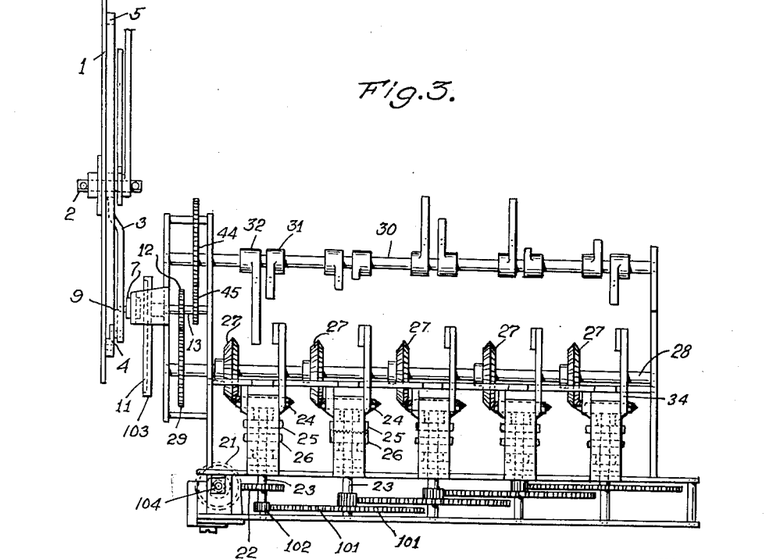

A nut 16 having an external cylindrical shape has a longitudinal flat surface portion $16_1$ and is screwed on a threaded rod $18_2$ which is connected to a socket 19 in which the flexible shaft $18_1$ is fastened, the flexible shaft $18_1$ being connected with the moving vehicle in the usual manner to transmit the value of the distance traveled. The flat surface portion $16_1$ of the nut 16 is engaged by the resilient arresting finger 17 fastened to the instrument frame and the nut 16 is thus prevented from rotating. As shown in Fig. 2, nut 16 is coaxial with the worm 21 and the small plate 20 mounted on its end. Thus, when the cable $18_1$ rotates, threaded rod $18_2$ also rotates and nut 16 is moved upwardly in the direction of the arrow (Fig. 2) into engagement with plate 20 of the worm 21. A friction coupling connection between the nut 16 and the plate 20 is then effected and continued rotation of the cable $18_1$ is transmitted directly to the worm 21, the force of the resilient finger 17 being overcome to permit the nut 16 to rotate freely.

The other four bevel pinions 27 keyed on the general driving shaft engage combined bevel pinions 24 loosely mounted on perpendicular secondary shafts 23. Each shaft 23 carries a slidably keyed coupling sleeve 26 identical with the above described one.

But the second shaft 23 is driven from the first shaft through a gear 101 engaging a pinion 102 keyed on said first shaft.

The third shaft 23 is driven in the same manner from the second shaft and the fourth shaft is driven in the same manner from the third one.

Parallel with the general driving shaft 28, the casing carries a coupling shaft 30 driven at one end through a gear 44 carried by this shaft and engaging a gear 45 keyed on the above described shaft 13. The teeth number ratio of gears 44, 45 engaging each other are such that for a turn of shaft 13, i. e. of cam 103, the coupling shaft 30 rotates by a fifth of its circumference, i. e. 72 degrees.

Coupling shaft 30 carries opposite each above described sliding sleeve 26 a set of two fingers, viz. a finger 31 for coupling and a finger 32 for declutching; both fingers 31, 32 of the same set are keyed on shaft 30 and displaced by 72 degrees from each other. Furthermore, each set of fingers 31, 32 is shifted with respect to the preceding one by the same angle of 72 degrees.

Figure 4:
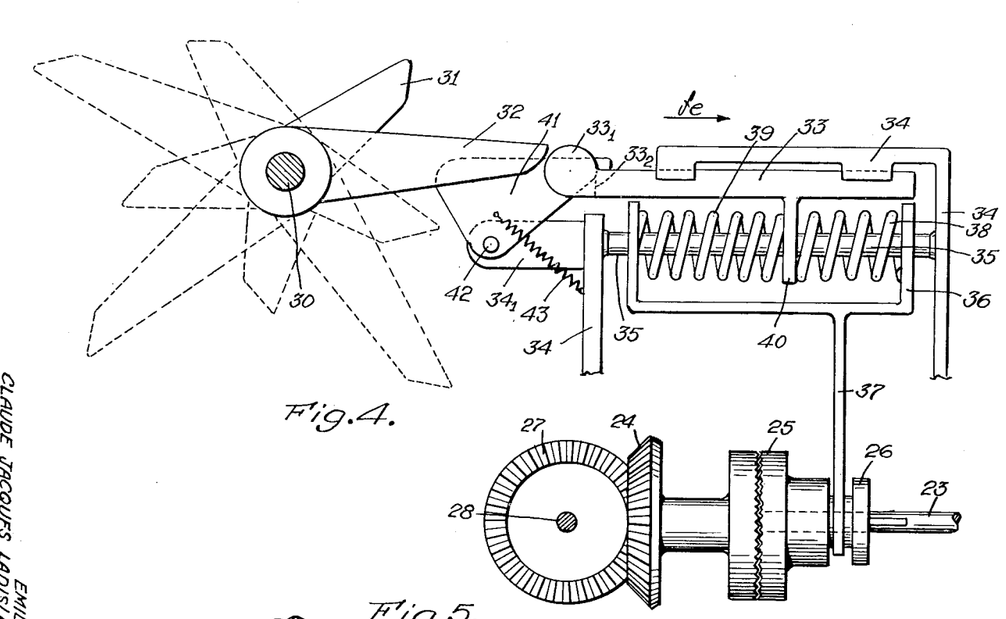
Figure 4 is an elevation on a larger scale showing the coupling and uncoupling means for the driving gears shown in Figs. 1, 2 and 3.
Figure 5:
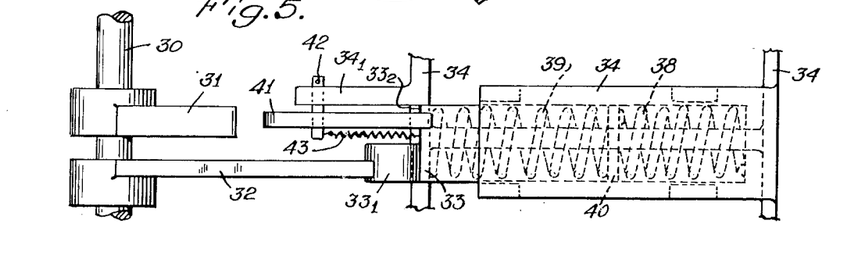
Figure 5 is a plan view of the mechanism shown in Fig. 4.

The coupling device of each bevel pinion 24 is shown on an enlarged scale in Fig. 4 and Fig. 5 in elevation and in plan, respectively. This device comprises a push piece 33 slidably mounted in a support 34 fast with the casing. Push piece 33 is fast with a cross lug 40 provided with a hole through which an axis 35 passes the axis 35 being secured to support 34 at its ends.

Slidably mounted on axis 35 is a cage 36 fast with an arm 37 which comes through its end to engage a groove of the corresponding coupling sleeve 26.

Two coil springs 38, 39 are fitted on axis 35 on both sides of lug 40 between lug 40 and the end walls of cage 36.

Push piece 33 has a rounded head $33_1$ opposite the finger 32 and a bearing surface $33_2$ opposite the finger 31. Push piece 33 is engaged along its bearing surface $33_2$ by a tappet 41 which is pivotally connected at 42 to an extension $34_1$ of support 34 and acted upon by spring 43 which is also connected to support 34.

The above described mechanism which drives driving disc 1 in response to the distance traveled works as follows:

When, for example, the apparatus is mounted on a vehicle and the displacement by each one-fifth of the circumference of the disc corresponds:

For the first fifth to a distance traveled of 10 to 100 meters,

For the second fifth to a distance traveled of 100 to 1000 meters,

For the third fifth to a distance traveled of 1 to 10 kilometers,

For the fourth fifth to a distance traveled of 10 to 100 kilometers, and

For the fifth to a distance traveled of 100 to 1000 kilometers, the following operation will take place.

The special coupling sleeve formed by the above described cylindrical nut 16 will start the device after a number of revolutions of the wheels of the vehicle corresponding to a displacement of 10 meters.

During this period, socket 18, through which the flexible shaft is fastened, is rotated so that the cylindrical nut 16, maintained against rotation by engagement of its flat surface against arresting finger 17, is displaced axially toward worm 21.

When the end of cylindrical nut 16 comes in contact against the small driving plate 20 secured to worm 21 the flat surface of cylindrical nut 16 escapes from resilient arresting finger 17 and cylindrical nut 16 then rotates with the socket 18 of the flexible shaft while driving the plate 20 by friction contact.

The thread of socket 18 is such that the number of revolutions of socket 18 which is necessary before the flat surface of nut 16 escapes from arresting finger 17 corresponds to the first 10 meters of the way traveled by the vehicle.

Worm 21 drives the general driving shaft 28 through the medium of wheel 22 on shaft 23, clutch 26 and bevel pinions 24, 27.

In turn, shaft 28 drives shaft 13 of cam 103 through the medium of spur gears 29 and 12. In turn, shaft 13 drives the coupling shaft 30 through the medium of pinions 45, 44.

When cam 103 is in the position shown in Fig. 2, slide 7 is in the upper part of the rectilinear slideway 8. In this position pawl 4 engages a notch of crown 5 of disc 1.

When cam 103 is thus rotated evenly through the above described device counterclockwise, as seen by an observer in front of disc 1, axis 9 of slide 7 then follows groove 11 of the cam and drives slide 7 downward along the rectilinear slideway 8 of the casing.

The other end of axis 9 engaging the longitudinal slideway 19 of crank 3 will slide in this slideway while rotating crank 3 clockwise.

Crank 3 will drive disc 1 through the medium of pawl 4, the nose of which engages the notch of crown 5.

After a complete turn of cam 103, pawl 4 will have rotated disc 1 by a fifth of a revolution; slide 7 will be in the lower part of the rectilinear slideway 8 and the end of axis 9 engaging groove 11 will have reached the point of groove 11 which is nearest the axis at one of the ends of the rectilinear part of groove 11.

At this moment, the opposed pawl 15 having engaged a notch of crown 5, crank 3 is raised with its pawl 4 under the action of spring 14, slide 7 following the rectilinear slideway 8 upwardly, the end of axis 9 following the rectilinear part of groove 11 in the cam, which at this moment is parallel with the rectilinear slideway 8 of the casing.

When crank 3 has reached its upper position, pawl 4 engages the next notch of crown 5.

After this first revolution of cam 103, corresponding to one-fifth of one revolution of disc 1, the speed of disc 1 is reduced in the ratio of the gear teeth (10:1) through declutching of the first bevel pinion 24 and coupling of the second pinion 24.

This double operation is effected by the coupling finger 31 and the declutching finger 32 which are carried by shaft 30. After the first revolution of the cam 103, declutching finger 32 comes in contact with the rounded head 33₁ of the push piece 33 which it pushes back in the direction of the arrow $f_2$ against the action of spring 38 which is thereby compressed. At the end of the stroke of push piece 33 (Fig. 4) the tappet 41 pivoting about its axis 42 under the action of spring 43 engages the bearing surface 33₂ of push piece 33 and push piece 33 is thus kept in its pushed back position with spring 38 under compression.

During this movement of push piece 33, cage 36 is shifted in the same direction while sliding on axis 35 and drives, through its arm 37, coupling sleeve 26 which is thus freed from bevel pinion 24. Then shaft 23 ceases to transmit its movement to the general driving shaft 28 through the medium of the first pair of bevel pinions 24, 27.

At the same time as this declutching of the first pair 24, 27, the coupling of the second pair is effected, the second pair having been in the declutched position, i. e. sleeve 26 on shaft 23 was freed from bevel pinion 24, push piece 33 being retained through tappet 41.

This coupling of the second pair of bevel pinions 24, 27 is effected through coupling finger 31 of the second set of fingers which engages the second tappet 41 and rocks the latter. The second push piece 33 actuated by the second spring 38 returns suddenly toward its coupled position while driving the second cage 36, the second arm 37 and the second sleeve 26, the notches of which engage the corresponding notches of the second bevel pinion 24.

The movement of shaft 23 is thus transmitted to the general driving shaft 28 through the medium of pinion 102 of wheel 101 of the second shaft 23, the second sleeve 26 and the second pair of bevel pinions 24, 27.

After this new complete revolution of cam 103, the second bevel pinion 24 will be declutched and the movement of the first shaft 23 will be transmitted to the general driving shaft 28 through the medium of the third shaft 23 and of both sets of speed-reducing gears interposed between both shafts 23.

The shifting from pinion to pinion thus continues progressively. Owing to the speed-reducing ratio of the gear pairs such as 102, 101 interposed between two consecutive shafts 23, the successive cam revolutions correspond each to one-fifth of one revolution of the disc and to distances which are ten times longer for each revolution.

The first revolution will correspond to a travel of 90 meters.

The second revolution will correspond to a travel of 900 meters.

The third revolution will correspond to a travel of 9,000 meters.

The fourth revolution will correspond to a travel of 90,000 meters.

The fifth revolution will correspond to a travel of 900,000 meters.

The means speed can thus be established, for example, for a distance of 900 kilometers.

It is possible, of course, by multiplying the notches of crown 5 and the sets of transmissions and declutching members, to make an apparatus for measuring greater distances.

The foregoing description has been concerned with the portion of the apparatus which is governed by the distance traveled.

Disc 1 driven in the above described manner moves in a reference crown 46 which is driven in terms of time according to the same law as that which governs the driving of the disc.

The crown 46 is actuated by a time dependent mechanism. This mechanism is shown in Figures 6, 7 and 8 of the drawings.

It comprises the same elements for the transmission of movement and declutching as the previously described mechanism. These elements are designated with the same reference numbers as those of the preceding mechanism but with the sub mark 1.

Figure 6:
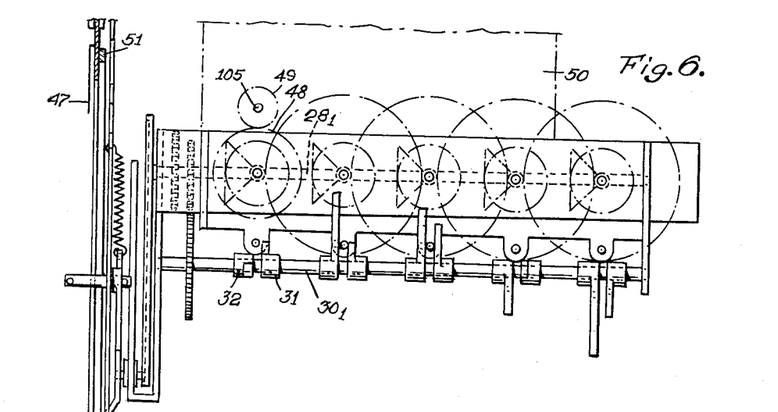
Figures 6, 7 and 8 are an elevational view, an end view and a top plan view, respectively, of the mechanism driving the crown of one of the movable members in response to the value of the time elapsed.
Figure 7:
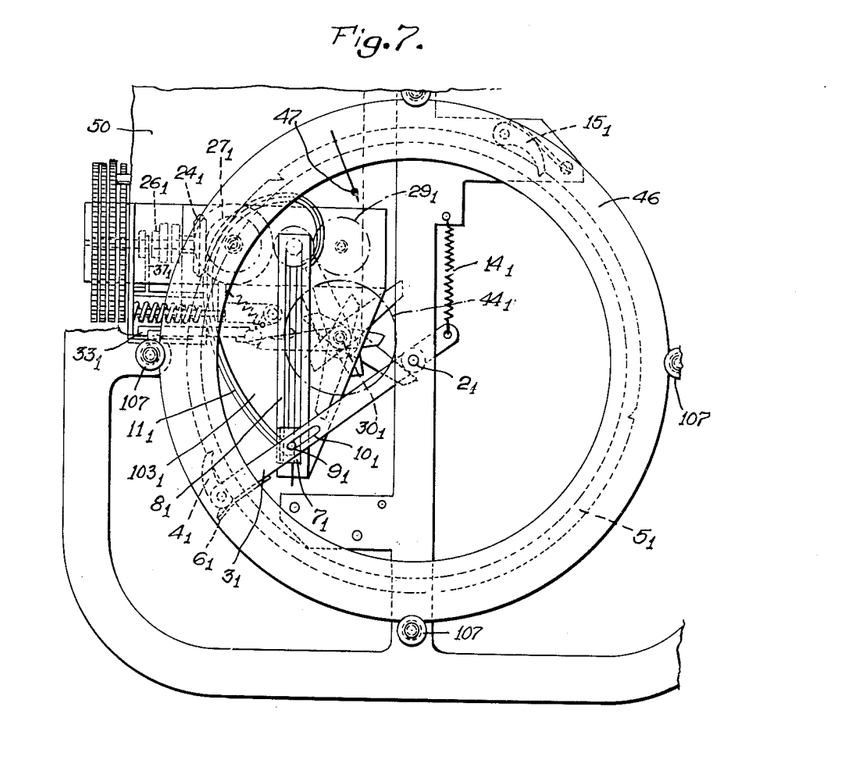
Figure 8:
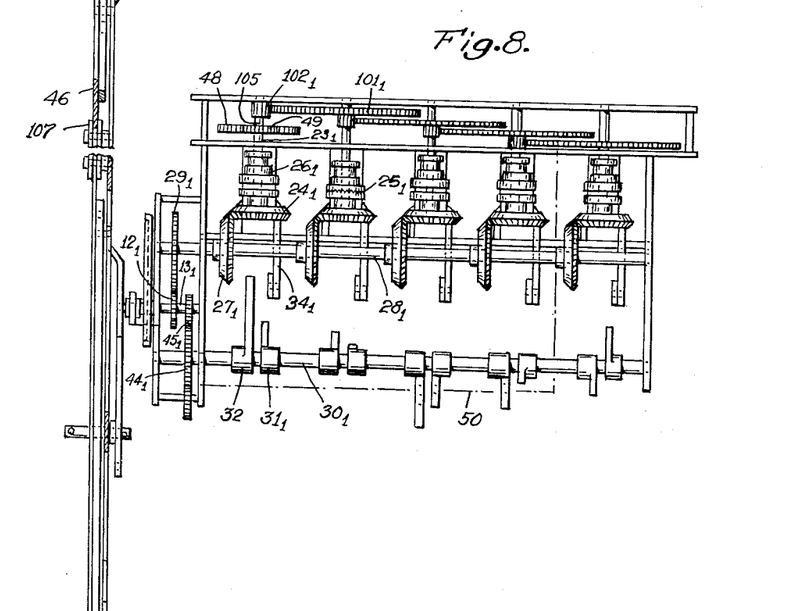

The mechanism shown on Figures 6, 7 and 8 is actuated by a clockwork of a known type, represented in chain dotted lines through its casing 50. The driving axis 105 projecting out of said casing carries a gear 49 engaging a gear 48 keyed on the first shaft $23_1$.

Crank $3_1$ carries, in this case, a pawl $4_1$ urged by a spring $6_1$ and having a nose which engages the periphery of a crown with five notches $5_1$ secured to the reference crown 46 which is arranged around disc 1 in the same plane as said disc and carries a reference mark 47 in the form of a pointer projecting over the disc.

Reference crown 46 rotates around its own axis through the medium of external rollers 107, the rotation axes of which are secured to the casing. The external edge of reference crown 46 engages a groove in these rollers.

In this mechanism, as in the preceding one, the speed-reducing ratio of gears such as $101_1$ and $102_1$ interposed between two consecutive shafts $23_1$ is 10 so that:

The first revolution of cam $103_1$ corresponds to one-fifth of one revolution of reference crown 46 and to the time elapsed between 0.01 and 0.1 minute.

The second revolution to the time elapsed between 0.1 and 1 min.

The third revolution to the time elapsed between 1 and 10 min.

The fourth revolution to the time elapsed between 10 and 100 min.

The fifth revolution to the time elapsed between 100 and 1000 min.

Figure 9:
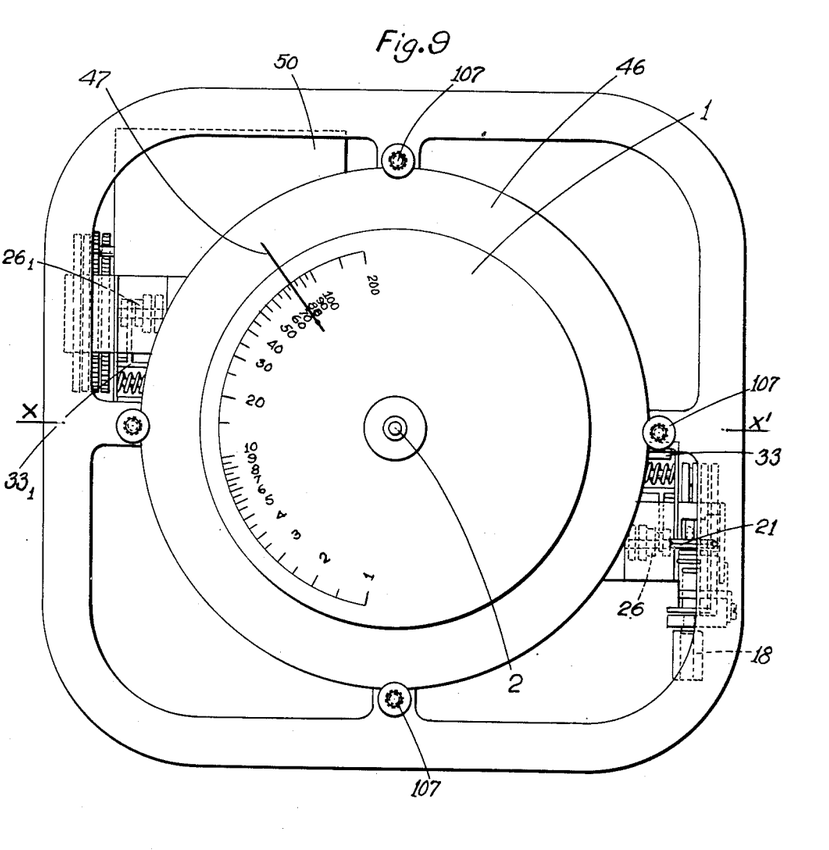
Figure 9 is a general view showing the apparatus as seen from the front facing the recording dial.

Both above-described mechanisms, viz. the time-dependent mechanism and the distance controlled mechanism, are arranged in the casing of the apparatus as shown in Figure 9 of the drawings.

The mechanism driving disc 1 in relation to the distance traveled is arranged behind the disc below the horizontal median plane XX' which passes through axis 2; thus, socket 18 of the driving flexible shaft extends downwardly.

The mechanism driving the reference crown 46 in relation to time is arranged, along with the clockwork 56, behind the plane of crown 46 above the horizontal median plane XX' which passes through axis 2.

Disc 1 is, for example, graduated according to a logarithmic division in mean speeds expressed in kilometers/hour.

Reference crown 46 carries the pointer 47 which projects in the direction of axis 2 above the graduations on disc 1.

Figure 10:
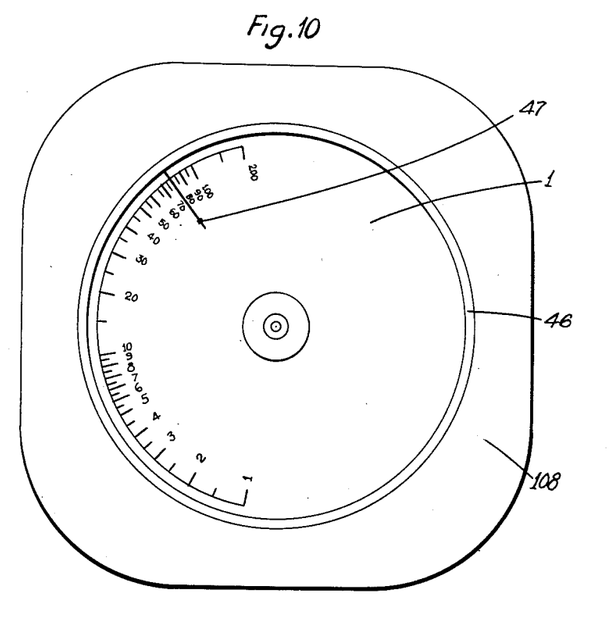
Figure 10 is an external view of the apparatus.

Figure 10 is an external view of the apparatus. A closure plate 108 secured to the casing leaves visible only the graduated disc 1 and the edge of crown 46 which carries pointer 47.

The graduated disc 1 and reference crown 46 are, as described, independent of each other and each is driven by a cam having a suitable profile which produces in the disc and the crown a rotation of one-fifth of one revolution for each revolution of the respective cams. The displacement of the disc and of the crown are effected from a common origin according to a logarithmic scale.

Since the displacement of disc 1 is proportional to the distance traveled and since that of the reference crown 46 is proportional to the time which has elapsed the relative position of disc 1 with respect to crown 46 is proportional to the quotient of the distance traveled by the time elapsed during the travel, i. e. to the mean speed at the moment under consideration. It is this relative position which is shown visually by the graduation of the disc which is read opposite the pointer of the crown.

The above described mean speed indicator makes it possible to insure numerous technical advantages and more particularly the device makes possible the direct reading of the desired means on disc 1 opposite pointer 47 of the reference crown. A calculation is no longer necessary.

For these reasons the device in accordance with the invention is an entirely mechanical one and requires little room and its operation is very reliable. It is suitable for numerous applications in various fields such as: motor cars, air and sea service, mechanics and the like.

We claim:

1. An apparatus for indicating an average value, comprising a first rotatable element, a first rotary cam having a logarithmically varying operative contour, first reduction gear driving means for effecting continuous rotation of said cam about an axis as a function of an integrated quantity such as the distance covered by a moving body, a first change speed gear in said driving means for effecting a change in the reduction ratio of said driving means after each revolution of said cam, a unidirectional drive means for said first rotatable element connected to said cam for actuation thereby and disposed for rotating said first rotatable element a fraction of a revolution for each revolution of the cam, the rotation of said first element thus being a function of the logarithm of the integrated quantity such as the distance covered, a second separately rotatable element, a second cam having a logarithmic contour, second reduction gear driving means for continuously rotating said second cam as a function of time, a second change speed gear in said second driving means for effecting a change in the reduction ratio of said second driving means after each revolution of said second cam, a second unidirectional drive means connected to be driven by said second cam and disposed for rotating said second element a fraction of a revolution for each revolution of said second cam, the rotation of said second member thus being a function of the logarithm of time and the distance between said two elements being an indication of an average quantity such as speed.

2. Apparatus as defined in claim 1, wherein said first unidirectional drive means includes a crank lever, a cam follower mounted for movement on said lever and arranged to engage and follow the profile of said first cam, whereby movement of said lever is effected by rotation of said cam, a pawl carried by said lever for engaging and rotating said first rotatable element, means for effecting the return of said lever to its initial position after each revolution of said cam, and means for holding said first rotatable element during the return movement of said lever.

3. Apparatus as defined in claim 2, wherein said first rotatable element comprises a disc having a crown provided with equidistant notches for engagement by said pawl.

4. Apparatus as defined in claim 1, further including an automatic clutch mechanism driven by said first cam and disposed intermediate said first change speed gear and said first cam, said first change speed gear comprising a plurality of stages and said automatic clutch mechanism having portions associated with said respective stages.

5. Apparatus as defined in claim 4, wherein said first change speed gear includes a plurality of successively arranged speed changing gear trains, a primary axle for transmitting driving power to said first cam, a plurality of secondary axles including one axle for each of said gear trains disposed at right angles to said primary axle, clutch means on each of said secondary axle for coupling the respective gear trains on said primary axle, a clutch controlled axle driven by said primary axle, a coupling and a decoupling control member for each of said clutch means carried by said control axle, said control members being disposed at successively different angles, whereby the respective clutch means are engaged thereby for control thereof at different rotary positions of said control axle.

6. Apparatus as defined in claim 5, further comprising a control movement transmitting mechanism intermediate said coupling and said decoupling members, said mechanism comprising a push element disposed to engage the clutch means on said secondary axles, and means for maintaining said push element in its decoupling position with respect to said clutch means after displacement thereof by said decoupling control element.

7. Apparatus as defined in claim 1, further comprising a drive shaft transmitting power from a distance measuring counter, and means for coupling said first means for effecting continuous rotation of said first cam to said shaft, said last-named coupling means having a threaded portion, a member mounted on said threaded portion having a flat part, and a stop member engaging said flat part for preventing rotation of said member during predetermined longitudinal displacement thereof with respect to said coupling means.

EMILE MARIUS GOURBEYRE.
CLAUDE JACQUES L. M. GOURBEYRE.

REFERENCES CITED

The following references are of record in the file of this patent:

FOREIGN PATENTS

| Number | Country | Date |
|--------|---------|------|
| 274,285 | Great Britain | July 21, 1927 |
| 340,013 | Great Britain | Dec. 12, 1930 |
| 620,336 | France | Jan. 17, 1927 |
| 674,857 | France | Oct. 28, 1929 |
| 744,298 | France | Jan. 21, 1933 |